United States Patent [19]

Pettyjohn

[11] Patent Number: 4,609,311

[45] Date of Patent: Sep. 2, 1986

[54] STUD HOLE BORING AND TAPPING MACHINE

[75] Inventor: William H. Pettyjohn, Chattanooga, Tenn.

[73] Assignee: Combustion Engineering, Inc., Windsor, Conn.

[21] Appl. No.: 535,178

[22] Filed: Sep. 23, 1983

[51] Int. Cl.$^4$ ............................................. B23B 41/14
[52] U.S. Cl. ...................................... 408/79; 408/111; 408/234; 408/712
[58] Field of Search .................. 408/72 R, 110, 113, 408/115 R, 712, 109, 111, 114, 79, 93, 97, 98, 107, 234; 29/402.03, 402.08, 726

[56] References Cited

U.S. PATENT DOCUMENTS

| | | | |
|---|---|---|---|
| 652,251 | 6/1900 | Cunningham | 408/79 |
| 766,713 | 8/1904 | Loetzer | 408/79 X |
| 3,663,115 | 5/1972 | Vindez et al. | 408/79 |
| 3,741,671 | 6/1973 | Douglass | 408/114 |
| 3,810,710 | 5/1974 | Ennemoser | 408/712 X |
| 4,011,024 | 3/1977 | Nakano et al. | 408/79 |
| 4,329,094 | 5/1982 | Cooley et al. | 408/79 X |
| 4,423,330 | 9/1984 | Chalier | 408/98 |

*Primary Examiner*—Z. R. Bilinsky
*Assistant Examiner*—Glenn L. Webb
*Attorney, Agent, or Firm*—Arthur E. Fournier, Jr.

[57] ABSTRACT

A device (10) is provided that is operative for purposes of accomplishing the drilling, boring and tapping of a relatively large size opening (106) in a body (17) while the latter is located in a hostile environment. The subject device (10) is characterized both in that it is portable and in that the boring and tapping functions are combined into the same device (10). The subject device (10) includes fixture means (18) for effecting the alignment of the device (10) relative to the opening (106) that is to be bored and tapped, support means (14) having a surface supported thereon in juxtaposed relation thereto, first operating means (16) supported on the aforesaid surface for movement relative thereto in a predetermined direction, and second operating means (104) cooperatively associated with the first operating means (16) for movement therewith and operative for purposes of performing certain machining operations.

5 Claims, 14 Drawing Figures

STUD HOLE BORING AND TAPPING MACHINE

BACKGROUND OF THE INVENTION

This invention relates to apparatus for performing machining functions, and more specifically to a boring and tapping machine that is particularly suited for employment in areas wherein a hostile environment prevails for purposes of accomplishing in the latter boring and tapping operations such as are required in the boring and tapping of stud holes.

One of the primary factors to which consideration normally is most often given before commencing the construction of a new manufacturing facility and/or the refurbishing of an old one is the nature of the product which will be manufactured therein. Further, the fact that particular types of facilities are better suited for the manufacture of certain kinds of products than are others is well accepted. Also, it has long been known that the configuration of the exterior and interior of a manufacturing facility as well as the manner in which the production equipment is arranged within the facility are predicated, in large measure if not entirely, upon the nature of the steps which are required to be performed in order to effect the successful manufacture of the given product in the particular facility.

Accordingly, it is thus not surprising that most products are manufactured at one location and are used at another. Moreover, the probability is such, at least in the case of most products, that if a product needs to be repaired at some point in its life, the product will not be returned to the place of its original manufacture for purposes of accomplishing the repair required thereof. Rather, the more likely probability is that the product in need of repair will either be returned to some form of service center located in relatively close proximity to the place whereat the product is being employed in order to effect the necessary repair thereof, or else the product will be repaired on site, i.e., at the actual location whereat the product is being employed.

From the preceding discussion it should be readily apparent that if the practice described above is followed, it will have a definite impact upon the nature of the production equipment, i.e., manufacturing apparatus, which is selected to be employed for purposes of accomplishing the manufacture and/or repair of the products in question. In addition, the aforedescribed practice will also impact upon where this manufacturing apparatus will be located. For example, in instances wherein the focus primarily is simply upon the original manufacture of the products, decisions regarding the nature of the apparatus which will be employed for this purpose normally will be based on a consideration of factors of a technical nature. That is, the decision as to the kind of apparatus which will be utilized will be influenced greatly by the considerations that are given to those factors which relate to the specific manufacturing operations, e.g., casting, grinding, drilling, etc., that will be required in order to originally produce the product. On the other hand, because this apparatus will be positioned at the site whereat the original manufacture of the product occurs, the installation of the apparatus thereat will be done with the view that this is intended to be a permanent installation. Accordingly, matters such as the size, weight, etc. of the apparatus that is selected for use will merit only secondary consideration.

Continuing, in other instances the focus is approximately equally distributed between the original manufacture of the products and the subsequent need to effect servicing and repair thereof. When deciding in such instances upon the nature of the manufacturing apparatus which will be selected for use in connection with the products in question, consideration must be given to both the requirements that need to be satisfied in connection with the original manufacture of the products as well as those which are associated with the servicing and/or repairing of the products. More specifically, factors relating to the manufacturing operations that are required to be performed in order to accomplish the manufacture of the product will have to be considered. Likewise, factors relating to the service and/or repair operations which it is anticipated will have to be performed in connection with the products will also have to be considered. As a result, the manufacturing apparatus which is selected for use in these instances may need to be different from that wherein the only consideration is the original manufacture of the products.

Thirdly, instances are known to exist wherein the primary focus is simply on the matter of effecting servicing and/or repair of the products as such functions become necessary. Obviously, in order to select apparatus that would be suitable for use in such circumstances consideration must of necessity be given to the nature of the operations that it is expected will have to be performed in connection with such servicing and/or repairing. Furthermore, consideration must be given as to where such servicing and/or repairing will most commonly take place, i.e., at some site remote from the location whereat use is normally made of the product, or at the same site as that at which the product is employed.

Regarding in particular those instances wherein there is a need to select apparatus which is suitable for use for purposes of effecting the repair of products at the situs thereof, the factors that may most influence this decision may turn out to be of a nontechnical nature, i.e., not related to the specific manufacturing operations that are required to be performed in order to effect the repairs. For example, the question of accessibility as it relates to the product itself as well as to the actual portion of the product which needs to be repaired may prove to be an important consideration. Likewise, the environment which exists at the site whereat the product is located may be an important consideration. In this connection, reference is had here to the existence thereat of conditions which might adversely affect personnel and/or the apparatus with which the repair is to be effected. Such conditions might take the form, for instance, of high temperatures, pollutants in the air, nuclear radiation, etc. On the other hand, this is not to indicate that no consideration needs to be given to the nature of the manufacturing operations which will have to be performed in order to successfully accomplish the repair of the product. Moreover, the factors mentioned above are not to be taken to be all-inclusive, but rather have been listed simply by way of exemplification.

One example of a situation wherein repairs and/or servicing are required to be performed at the product sites is that of nuclear power generation systems. Not only is the performance of repairs and/or servicing required in this instance to be carried out at the site of the nuclear power generation system, but the performance thereof is further complicated by the environmental conditions that exist thereat and under which the repairs must be effected. Namely, the matter of exposure to nuclear radiation in terms of the products that must be repaired and/or serviced, the personnel that are to accomplish the repair and/or servicing, and the apparatus that will be utilized for purposes of effecting the repair and/or servicing must be given consideration. In addition, one must be concerned with the physical accessibility of the nuclear product that is in need of repair and/or servicing. As a consequence, it is found that in many instances the apparatus that are available for use to effect the repair and/or servicing of nonnuclear oriented products are not suitable for use for purposes of effecting the repair and/or servicing of nuclear oriented products. To this end, new apparatus often must be developed specifically for use for purposes of accomplishing the repair and/or servicing of nuclear products, and particularly where such repair and/or servicing must be performed at the nuclear power generation system site.

The fact that a need has in actuality been evidenced for one such new apparatus is known in the prior art. That is, it is known that there has existed in the prior art a need for a new apparatus operative to effect the drilling, boring and tapping in a surface of openings of relatively large size. Moreover, it is known that further requirements of this new apparatus include that it be portable, that it be capable of use in a hostile environment, and that the openings formed thereby be capable of being precisely located in the surface in which they are made. More specifically, one application in particular which is known to exist for this new apparatus is the drilling, boring and tapping of new stud holes in the flange of a nuclear reactor pressure vessel which has already been placed in use as one of the operating components of an existing nuclear power generation system.

It is, therefore, an object of the present invention to provide a new and improved apparatus that is operative for performing selected machining operations.

It is another object of the present invention to provide such an apparatus wherein the selected machining operations performed therewith consists of drilling, boring and tapping operations.

It is still another object of the present invention to provide such an apparatus for performing drilling, boring and tapping operations wherein such operations are conducted in a hostile environment.

A further object of the present invention is to provide such an apparatus for performing drilling, boring and tapping operations in a hostile environment wherein a characteristic of the apparatus is that it is portable.

A still further object of the present invention is to provide such an apparatus for performing drilling, boring and tapping operations in a hostile environment wherein a characteristic of the apparatus is that the boring means and the tapping means are combined in one apparatus.

Yet another object of the present invention is to provide such an apparatus for performing drilling, boring and tapping operations in a hostile environment wherein a characteristic of the apparatus is that the openings formed thereby are capable of being precisely located relative to the surface in which they are made.

Yet still another object of the present invention is to provide such an apparatus for performing drilling, boring and tapping operations in a hostile environment wherein the apparatus is characterized in that it is relatively inexpensive to provide, is easy to employ, yet is capable of providing reliable operation.

SUMMARY OF THE INVENTION

In accordance with the present invention there is provided an apparatus which is particularly suited to be used for purposes of accomplishing the drilling, boring and tapping of openings of relatively large size in a surface while the latter surface is located in a hostile environment. The subject apparatus includes tie down means operative for purposes of establishing the position of the apparatus relative to the point on the surface whereat it is desired to accomplish the drilling, boring and tapping of a particular opening. An angle support means is suitably secured on the tie down means in upstanding relation thereto. Attached to the angle support means is a master feed table means. Cooperatively associated in operative relation with the master feed table means is a master machine head means such that the latter is mounted for movement relative thereto in a plane which extends parallel to the longitudinal axis of the master feed table means. The master machine head means has a drive shaft housing means suitably secured thereto for movement therewith. Further, the subject apparatus includes boring means and tapping means that are each designed to be operatively associated with the drive shaft housing means such as to be moveable relative to the location on the surface whereat it is desired to provide an opening whereby the boring and tapping of the opening in question can be accomplished therewith.

DESCRIPTION OF A PREFERRED EMBODIMENT

Figure 1:
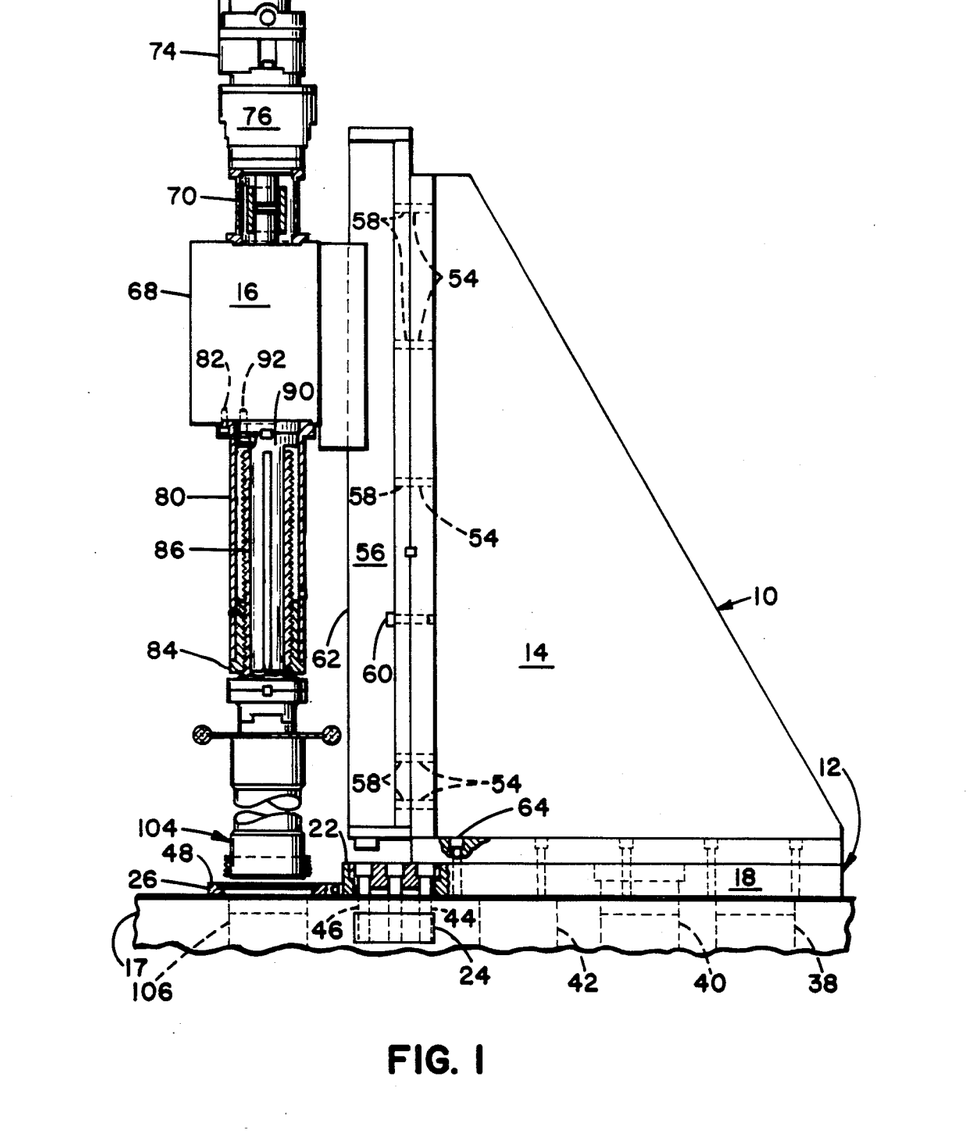
FIG. 1 is a side elevational view, with some parts broken away, of an apparatus for the drilling, boring and tapping of openings of relatively large size in a hostile environment, constructed in accordance with the present invention.
Figure 2:
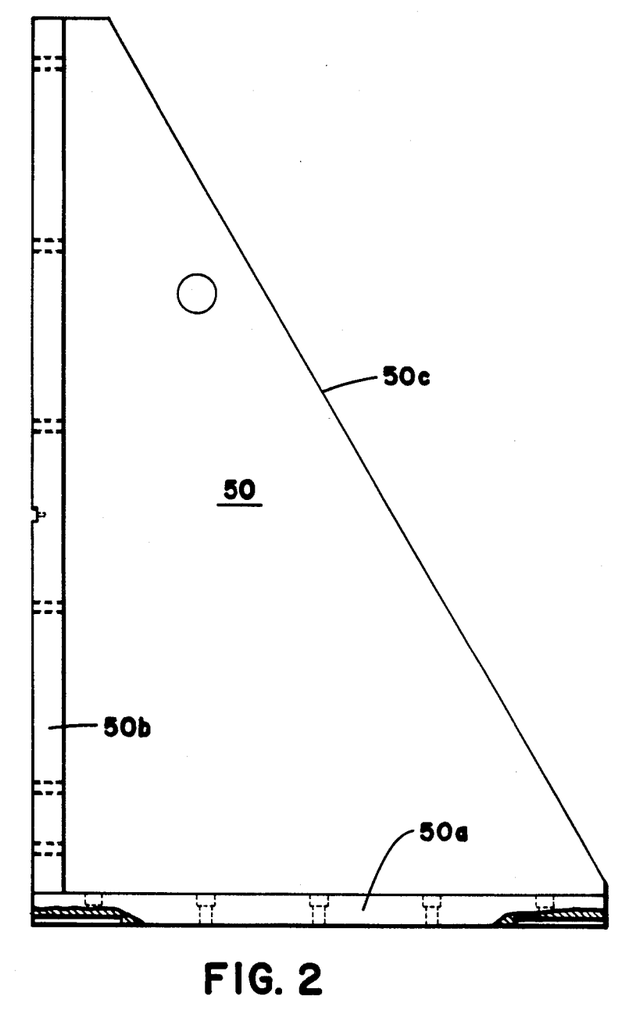
FIG. 2 is a side elevational view of the angle support bracket employed in the apparatus of FIG. 1, constructed in accordance with the present invention.

Referring now to the drawing, and more particularly to FIG. 1 thereof, there is depicted therein an apparatus, generally designated by the reference numeral 10, constructed in accordance with the present invention. The apparatus 10 is particularly suited to be used for purposes of accomplishing drilling, boring and tapping operations in a surface while the latter surface is located in a hostile environment. As best understood with reference to FIG. 1 of the drawing, the apparatus 10 consists of the following major components: tie down means, generally designated by the reference numeral 12, operative for purposes of establishing the position of the apparatus relative to the point on the surface whereat it is desired to accomplish the drilling, boring and tapping of a particular opening; support means, generally designated by the reference numeral 14, cooperatively associated with the tie down means 12 and operative as a support for other components of the apparatus 10; and machining means, generally designated by the reference numeral 16, cooperatively associated with the support means 14 and operative to perform machining operations.

In order to best understand the nature of the construction and the mode of operation of the apparatus 10, it is believed desirable to describe the apparatus 10 in the context of the latter being employed to establish an opening at a particular location in a given surface. Accordingly, for purposes of the description that follows, the use to which the apparatus 10 is being put will be assumed to be that of the boring and tapping of a stud hole in the flange of a pressure vessel, the latter being of the type that normally can be found employed in a nuclear power generation system as one of the principal operating components thereof. More specifically, it will be assumed that the apparatus 10 is being utilized to bore and tap a new stud hole in the flange of a nuclear pressure vessel after the vessel has been in use for a period of time such that the new stud hole must be formed while the pressure vessel is positioned in a hostile environment, i.e., wherein there is, for instance, nuclear radiation. With reference, therefore, to FIG. 1 of the drawing, it shall be assumed that the surface which is identified therein by the reference numeral 17 comprises the flange of a nuclear pressure vessel, and that this pressure vessel is positioned in a hostile environment.

Figure 5:
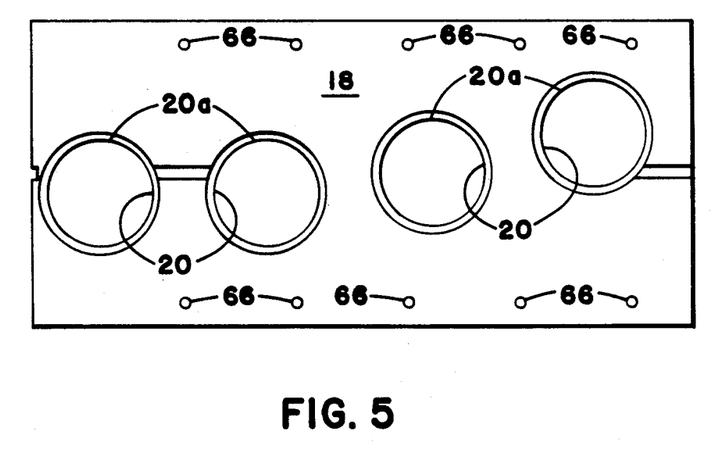
FIG. 5 is a plan view of the tie down plate employed in the apparatus of FIG. 1, constructed in accordance with the present invention.

Proceeding now with the description of the nature of the construction of the apparatus 10, the tie down means 12 thereof will first be described. Further, in this connection reference will be had in particular to FIGS. 1, 5, 6, 7 and 8 of the drawing. Referring thus to FIG. 1, the tie down means 12 includes a tie down plate 18. Preferably, the tie down plate 18 is made from a suitable metal, and as seen with reference to FIG. 5 is substantially rectangular in configuration. Continuing, the tie down plate 18 is provided with a plurality of openings 20 formed therethrough. For a purpose yet to be described, the openings 20 are precisely located in the tie down plate 18 such as to bear a specific relationship one to another whereby the tie down plate 18 is capable of being employed much in the manner of a template. It will be noted that in accordance with the preferred embodiment of the invention the tie down plate 18 is provided with four openings 20. However, it is to be understood that the tie down plate 18 could be provided with a greater or a lesser number of openings 20 without departing from the essence of the invention.

Figure 6:
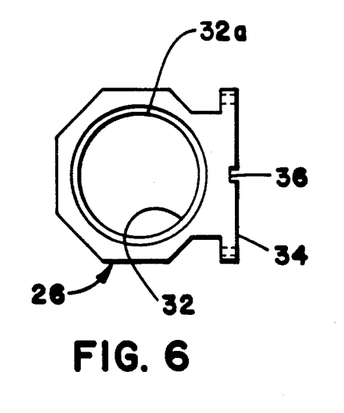
FIG. 6 is a plan view of the alignment fixture for the tie down plate employed in the apparatus of FIG. 1, constructed in accordance with the present invention.
Figure 7:
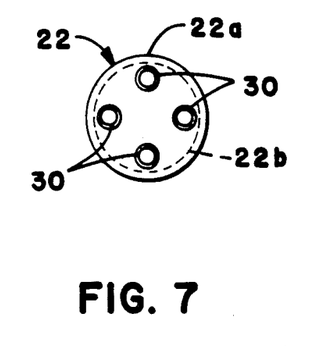
FIG. 7 is a plan view of the tie down disc employed in the apparatus of FIG. 1, constructed in accordance with the present invention.
Figure 8:
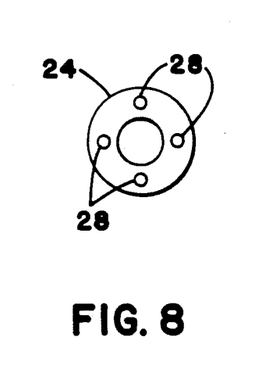
FIG. 8 is a plan view of the tie down plug employed in the apparatus of FIG. 1, constructed in accordance with the present invention.

Encompassed within the tie down means 12 there is also to be found a tie down disc 22, a tie down plug 24 and an alignment fixture 26, the latter elements being shown in FIGS. 7, 8 and 6, respectively. Regarding first the tie down plug 24, the latter is substantially circular in configuration. Moreover, the circumferential external surface thereof is suitably provided with threads for a purpose yet to be described. In addition, the tie down plug 24 has a number of threaded holes 28, i.e., four in number in accordance with the illustrated embodiment thereof, formed therethrough. The threaded holes 28 are positioned in equidistant relation one to another around the circumference of the tie down plug 24.

Considering next the tie down disc 22, the latter in the manner of the tie down plug 24 is also substantially circular in configuration. Further, the tie down disc 22 includes a first portion 22a having a diameter that is larger than the diameter of the tie down plug 24, and a second portion 22b having a diameter which is substantially the same as that of the tie down plug 24. In addition, the tie down disc 22 is provided with a plurality of unthreaded holes, identified in FIG. 7 by the reference numeral 30. As seen with reference to FIG. 7, the tie down disc 22 is provided with four such holes, which are positioned in equidistant relation one to another around the circumference of the tie down disc 22, i.e., in like fashion to the holes 28 of the tie down plug 24. Finally, the holes 30 of the tie down disc 22 are preferably each provided, for a purpose yet to be described, with a counterbore.

Turning attention now to the alignment fixture 26, the latter as seen with reference to FIG. 6 of the drawing has an opening, denoted therein by the reference numeral 32, of relatively large size formed therethrough. As will be explained more fully hereinafter, the diameter of the opening 32 is made such as to be at least as large as the stud hole that it is desired to provide in the flange 17. Further, in accord with the illustrated embodiment thereof the opening 32 is provided with a suitable chamfer, seen at 32a in FIG. 6. With regard to the alignment fixture 26, the latter has one side thereof, i.e., that denoted in FIG. 6 of the drawing by the reference numeral 34, which is substantially planar in nature. Further, the side 34 of the alignment fixture 26 is provided with a suitably dimensioned cutout 36, for a purpose yet to be described, formed therein substantially equidistant from the ends thereof.

The manner in which the tie down means is employed will now be described with reference in particular to FIG. 1 of the drawing. First, however, note will be taken here of the fact that the flange 17 in which it is desired to provide a new stud hole preferably already has a number of threaded openings, seen in phantom lines at 38, 40, 42 and 44 in FIG. 1, formed therein. Moreover, under normal circumstances most, if not all, of the threaded openings 38, 40, 42 and 44 would have been provided in the flange 17 at the time of the original manufacture of the nuclear pressure vessel of which the flange 17 is a portion.

Continuing, a tie down plate, e.g., the tie down plate 18, is selected which has formed therein a plurality of openings, e.g., the openings 20, that have substantially the same diameter and the same spacing therebetween as do the threaded openings 38, 40, 42 and 44 with which the flange 17 is provided. As noted previously hereinbefore the tie down plug 24 is externally threaded. Moreover, the threads with which the tie down plug 24 is provided are complementary to the threads with which the openings 38, 40, 42 and 44 in the flange 17 are each provided. Accordingly, one such tie down plug 24 is threaded to a suitable extent into each of the openings 38, 40, 42 and 44 in the flange 17. The tie down plate 18 is then positioned in superimposed relation over the flange 17 such that each of the openings 20 in the tie down plate 18 is aligned with a corresponding one of the openings, 38, 40, 42 and 44 in the flange 17. Next, a tie down disc 22 is seated in each of the openings 20 with which the tie down plate 18 is provided. To this end, the diameter 22a of the tie down disc 22 is selected to be such that it corresponds to the counterbore 20a with which each of the openings 20 in the tie down plate 18 is suitably provided, while the diameter 22b of the tie down disc 22 is selected to be such that it fits within the bore of a corresponding one of the openings 20. Thereafter, the tie down plate 18 is secured in place on the flange 17 through the use of any suitable conventional form of fastening means. In accord with the preferred embodiment of the invention and as illustrated in FIG. 1 of the drawing, the aforereferenced fastening means preferably takes the form of threaded fasteners 46, which are made to pass through the unthreaded holes 30 in the tie down disc 22 and are threadedly engaged in the threaded holes 28 with which the tie down plug 24 is provided. It will be noted with reference to FIG. 1 that the heads of the threaded fasteners 46 are suitably dimensioned so as to be receivable within the counterbore with which each of the unthreaded holes 30 of the tie down disc 22 is provided as previously described herein.

Turning now to a consideration of the support means 14, reference will be had for this purpose in particular to FIGS. 1, 2, 3 and 4 of the drawing. As best understood with reference to FIG. 1, the support means 14 includes an angle support bracket denoted in the drawing by reference numeral 50. The angle support bracket 50, in accord with the illustrated embodiment thereof, is substantially triangular in configuration. More specifically, the angle support bracket 50 is comprised of a first base member 50a, a second base member 50b having a length greater than the first base member 50a and an upstanding triangularly shaped member 50c integrally joined to both the base member 50a and the base member 50b.

Figure 4:
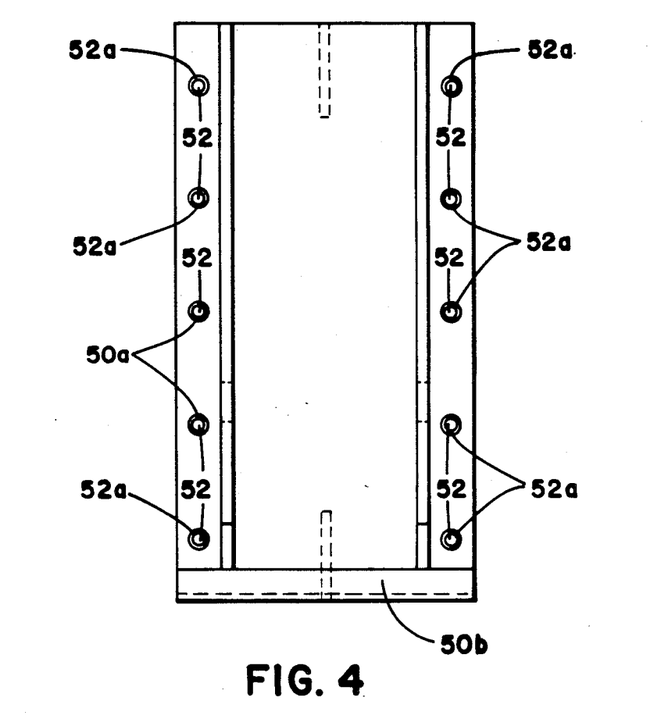
FIG. 4 is an end view of the angle support bracket employed in the apparatus of FIG. 1, constructed in accordance with the present invention.

As best seen with reference to FIG. 4 of the drawing, the base member 50a has a multiplicity of unthreaded holes 52 formed in suitably located positions therein. Moreover, the holes 52, each of which is provided with a counterbore 52a, are preferably arranged in two rows, one row extending longitudinally along the length of each side edge of the base member 50a. In accord with the illustrated embodiment of base member 50a, each of the aforesaid two rows includes five holes 52 spaced, as regards each row, in equidistant relation one to another. The holes 52 as will be described more fully hereinafter are utilized in connection with the mounting of the angle support bracket 50 to the tie down plate 18.

Figure 3:
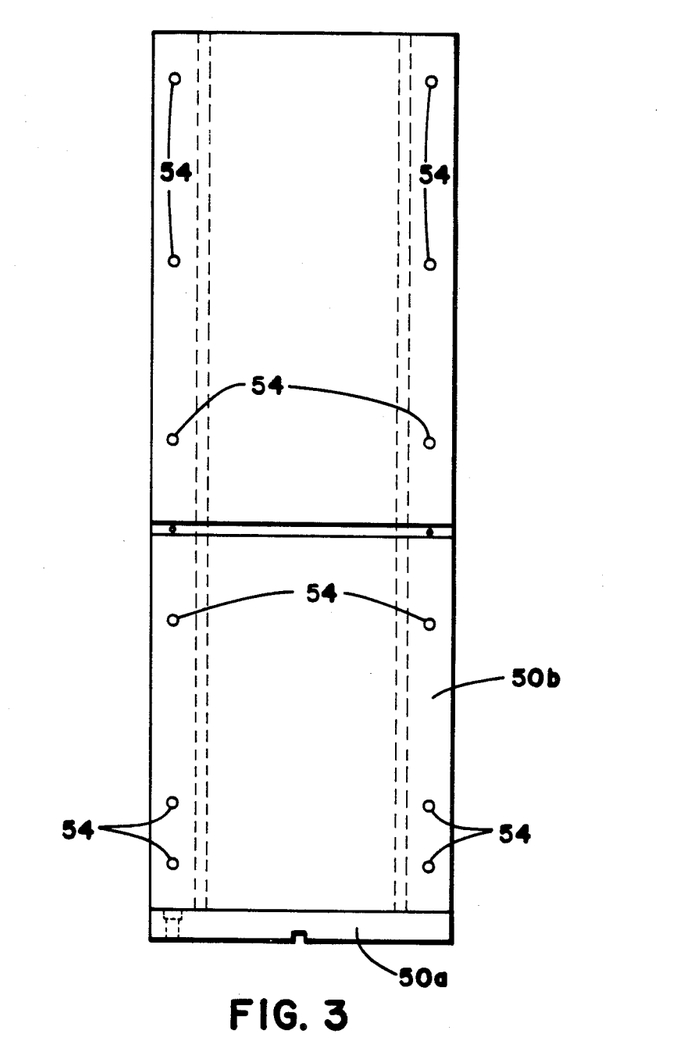
FIG. 3 is a top view of the angle support bracket employed in the apparatus of FIG. 1, constructed in accordance with the present invention.

As shown in FIG. 3, the base member 50b has formed therein a multiplicity of holes, the latter being denoted by the reference numeral 54. Like the holes 52 of base member 50a, the holes 54 are arranged in two rows extending longitudinally along the length of the side edges of the base member 50b. However, unlike the holes 52 of base member 50a, the holes 54 of base member 50b, for a purpose yet to be described, are threaded. Finally, preferably there are six such holes in each row thereof, and as regards each row thereof, the holes 54 are suitably spaced one from another.

Continuing, the support means 14 further includes a master feed table, designated in FIG. 1 by the reference numeral 56. The master feed table 56 essentially consists of an elongated member having a length which is slightly longer than that of base member 50b. Moreover, as best understood with reference to FIG. 1, the master feed table 56 is designed to be suitably secured to a surface of the base member 50b of angle support bracket 50. To this end, the master feed table 56 has formed therein a plurality of unthreaded holes 58, corresponding both in number and in spacing to the threaded holes 54 with which the base member 50b is provided. Accordingly, to effectuate the mounting of master feed table 56 to the angle support bracket 50 suitable fastening means are employed. Namely, as seen with regard to FIG. 1, threaded fasteners 60, only one of which has been depicted in FIG. 1 in the interest of maintaining clarity of illustration therein, are made to pass through each of the unthreaded holes 58 in the master feed table 56 and are received in threaded engagement in the threaded holes 54 of base member 50b of angle support bracket 50. Finally, the surface 62 of master feed table 56 is suitably configured in a conventional manner so as to be operative for purposes of enabling the machining means 16 to be cooperatively associated therewith in a manner and for a purpose which will be more fully described hereinafter. That is, the surface 62 is designed to function in the manner of a track upon which the machining means 16 in known fashion can be made to move to and fro along the length thereof.

The angle support bracket 50 with the master feed table 56 affixed thereto is in turn mounted to the tie down plate 18 through the use of any suitable conventional form of fastening means. In accord with the illustrated embodiment of the invention, however, the mounting of the angle support bracket 50 to the tie down plate 18 is preferably accomplished through the use of threaded fasteners seen at 64 in FIG. 1 which are made to pass through the unthreaded holes 52 with which the base member 50a of angle support bracket 50 is provided and are threadedly engaged in threaded holes 66 with which the tie down plate 18 as seen in FIG. 1 is suitably provided for this purpose. To this end, the threaded holes 66 are suitably provided in the tie down plate 18 so as to correspond in number as well as location to the number and location of the holes 52 with which base member 50a is provided. Also, the heads of the threaded fasteners 64 are preferably suitably dimensioned so as to be receivable within the counterbore 52a whereby a flush fit exists therebetween.

Figure 10:
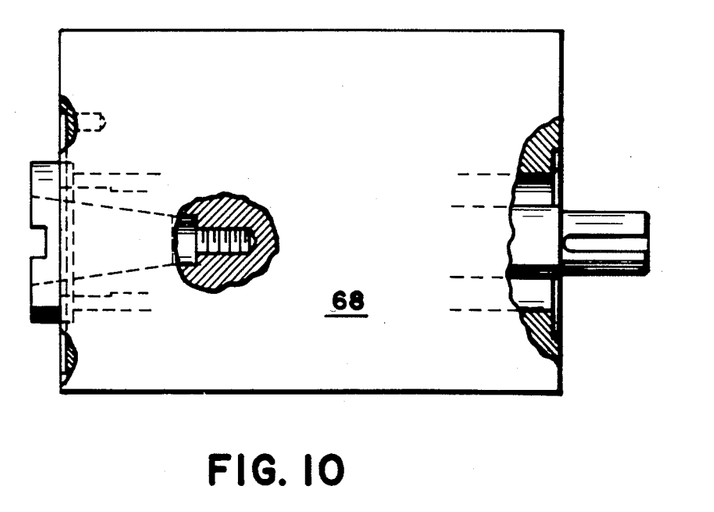
FIG. 10 is a side elevational view, with some parts broken away, of the master machining head employed in the apparatus of FIG. 1, constructed in accordance with the present invention.

The remaining one of the major operating components of the apparatus 10, constructed in accordance with the present invention, which has yet to be described herein is that of the machining means 16. A description will, therefore, now be had of the nature of the construction and the mode of operation of the machining means 16 of FIG. 1. As will be best understood with reference to FIG. 1 of the drawing, the machining means 16 includes a master machine head, denoted therein by the reference numeral 68, which is cooperatively associated in known fashion with the master feed table 56 so as to be moveable along the surface 62 of the latter in a plane extending parallel to the longitudinal axis of the master feed table 56. Reference may be had to FIG. 10 of the drawing for an illustration of the master machine head 68.

Figure 14:
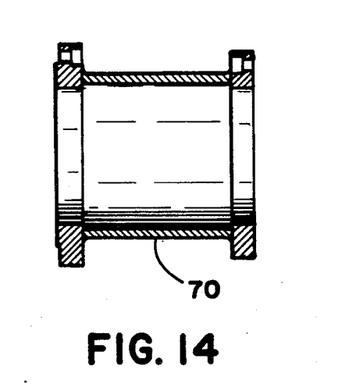
FIG. 14 is a cross-sectional view of the drive unit adaptor employed in the apparatus of FIG. 1, constructed in accordance with the present invention.

Continuing, the master machine head 68 as best seen with reference to FIG. 1 of the drawing, has secured at one end thereof in operative relation thereto a spindle drive adaptor 70, the latter being depicted in FIG. 14 of the drawing. In accord with the illustrated embodiment of the invention, the spindle drive adaptor 70 is preferably secured to the master machine head 68 for movement therewith by means of conventional fashioning means such as threaded fasteners 78, one of which is depicted in FIG. 1.

With reference to FIG. 1 of the drawing, the spindle drive adaptor 70 has cooperatively associated therewith in operative relation thereto an assembly consisting of a hydraulic motor, denoted in the drawing by the reference numeral 74 and a gear box, designated by the reference numeral 76. More specifically, the hydraulic motor 74 is operatively engaged with the spindle drive adaptor 70 through the gear box 76 such that rotation is imparted to the spindle drive adaptor 70 from the hydraulic motor 74. For this purpose, any suitable conventional form of hydraulic motor and gear box may be utilized. The hydraulic motor 74 and gear box 76 are secured one to another in any suitable conventional fashion. Further, the gear box 76 is secured in turn to the spindle drive adaptor 70 preferably through the use of conventional threaded fasteners, one of which is depicted at 78 in FIG. 1.

Depending on the nature of the machining operation that it is desired to have performed through the use of the apparatus 10, means suitable for this purpose is operatively connected to the other end of the master machine head 68. That is, if the apparatus 10 is to be utilized to effect a boring operation, or a drilling operation, or a tapping operation a tool suitable for use for this purpose is operatively connected through the master machine head 68. By way of exemplification, and not limitation in this regard, a description will now be had of the apparatus 10 as depicted in FIG. 1 wherein a means suitable for use for accomplishing tapping operations is shown operatively connected to the master machine head 68.

Referring thus to FIG. 1, a drive shaft housing, denoted by the reference numeral 80, is depicted therein secured to one end of the master machine head 68. To effect this connection of the drive shaft housing 80 to the master machine head 68 threaded fasteners of a conventional form are preferably employed, one such threaded fastener being seen at 82 in FIG. 1. In accord with the illustrated embodiment of the invention the drive shaft housing 80 as best seen with reference to FIG. 1 of the drawing has a threaded bushing 84 mounted therein at the lower end thereof as viewed with reference to FIG. 1. From a dimensional standpoint the outer diameter of the threaded bushing 84 is such that in essence an interference fit exists between the outer diameter of the threaded bushing 84 and the inner diameter of the drive shaft housing 80. Further, the threaded bushing 84 preferably is retained in place within the drive shaft housing 80 by means of conventional fastening means such as the fastener seen at 86 in FIG. 11.

Figure 11:
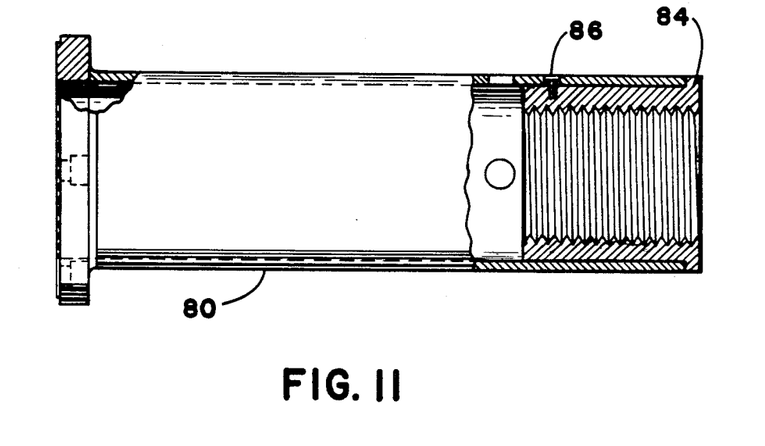
FIG. 11 is a side elevational view, with some parts broken away, of the drive shaft housing and threaded bushing, the latter being depicted cooperatively associated with the former, employed in the apparatus of FIG. 1, constructed in accordance with the present invention.
Figure 12:
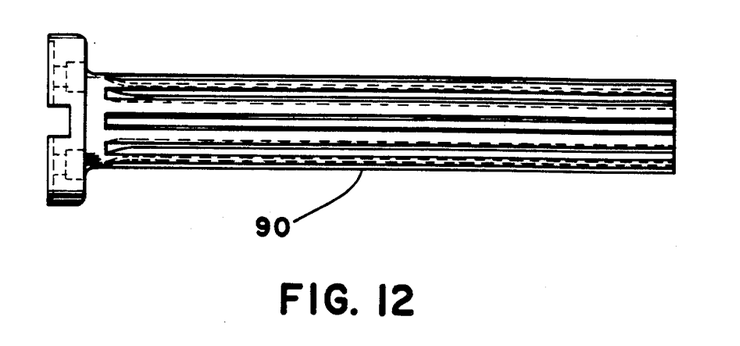
FIG. 12 is a side elevational view of the splined shaft employed in the apparatus of FIG. 1, constructed in accordance with the present invention.
Figure 13:
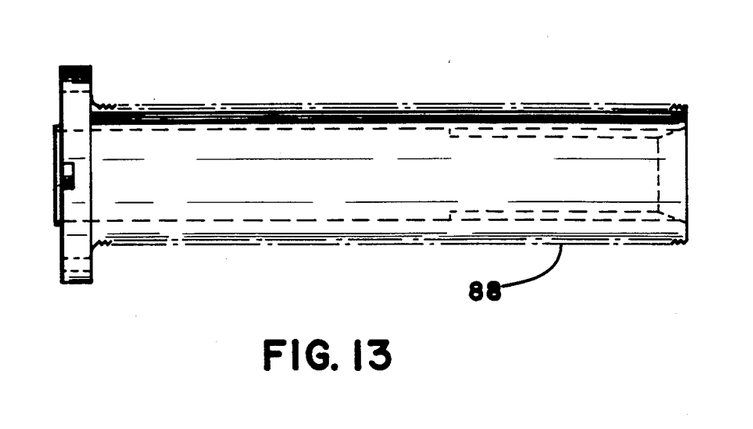
FIG. 13 is a side elevational view of the threaded and splined shaft employed in the apparatus of FIG. 1, constructed in accordance with the present invention.

Next, as best understood with reference to FIGS. 1 and 13 of the drawing, a threaded and splined shaft, denoted by the reference numeral 88 in the drawing is cooperatively associated with the drive shaft housing 80. More specifically, the threaded and splined shaft 88 is suitably dimensioned so as to be insertable within the drive shaft housing 80 whereupon in known fashion the former is maintained in mounted relation relative to the latter. Further, the threaded and splined shaft 88 in accord with the illustration of FIG. 1 is designed to receive therein a splined shaft, designated by the reference numeral 90 in the drawing and embodying a construction as depicted in FIG. 11. In its mounted condition, the splined shaft 90 is preferably secured to the master machine head 68 through the use of conventional fastening means such as threaded fasteners, one of which is illustrated at 92 in FIG. 1. To thus summarize, operatively connected to the master machine head 68 is an assembly consisting of the drive shaft housing 80, the threaded and splined shaft 86 which is suitably positioned in mounted relation within the drive shaft housing 80, and a splined shaft 90 which is received within the threaded and splined shaft 88. Moreover, the drive shaft housing 80 and the splined shaft 90 are each secured to the master machine head 68 through the use of threaded fasteners 82 and 92, respectively.

Figure 9:
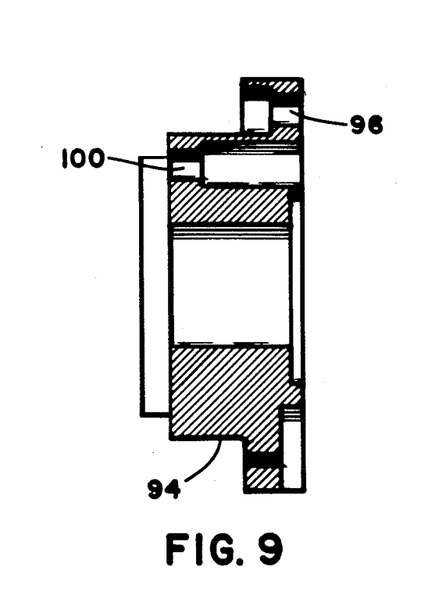
FIG. 9 is a cross-sectional view of the tap shank to splined shaft adaptor employed in the apparatus of FIG. 1, constructed in accordance with the present invention.

Continuing, the aforereferenced assembly consisting of the drive shaft housing 80, threaded and splined shaft 86 and splined shaft 90 has mounted thereto at the other end thereof a tap shank to drive shaft adaptor, which is denoted by the reference numeral 94 in the drawing. As best understood with reference to FIG. 9 of the drawing the tap shank to drive shaft adaptor 94 is provided with a suitably dimensioned opening seen at 96 through which a threaded fastener is made to pass whereby the threaded fastener serves to secure the tap shank to drive shaft adaptor 94 to the threaded and splined shaft 86. Moreover, the tap shank to drive shaft adaptor 94 is provided with another suitably dimensioned opening 100 which is designed to receive a threaded fastener whereby the mounting of machining means, which in accord with the illustration of FIG. 1 comprises a collapsible tap means, identified generally in FIG. 1 by the reference numeral 104, is effected. The collapsible tap means 104 may embody any conventional form of construction suitable for use in the aforedescribed manner.

A description will now be had of the mode of operation of the apparatus 10 constructed in accordance with the illustration thereof in FIGS. 1–14 of the drawing. In this connection, it will be assumed for purposes of the following description that the apparatus 10 is being employed to provide a new stud hole, the latter being identified by the reference numeral 106 in FIG. 1. in the flange 17 of a nuclear reactor pressure vessel while the latter is located in a hostile environment. To this end, a tie down plate 18 having a plurality of openings 20 suitably located therein so as to correspond to the openings 38, 40, 42 and 44 in the flange 17 is superimposed over the flange 17. The tie down plate 18, and thereby the apparatus 10 is secured in place relative to the location in the flange 17 whereat the new stud hole 106 is to be provided through the use of a tie down plug 24 which is suitably threaded into each of the openings 38, 40, 42 and 44 in the flange 17, the tie down discs 22 that are positioned in the openings 20 of the tie down plug 18, and threaded fasteners 46 that serve to fasten the tie down discs 22 to the tie down plugs 24. By affixing the tie down plate 18 to the flange 17 in the aforedescribed manner, the alignment fixture 26 is caused to be positioned over the location whereat the new stud hole 106 is to be formed in the flange 17. With the apparatus 10 thus secured to the flange 17, the machining means 16 is caused to move along the master feed table 56 by any suitable conventional form of motor means (not shown). Preferably, however, the latter takes the form of a conventional hydraulic motor (not shown) connected through a suitable adaptor (not shown) to the machining means 16 such that the latter can be moved longitudinally along the length of the master feed table 56 whereby to establish the position of the machining means 16 relative to the surface of the flange 17 whereat the new stud hole 106 is to be formed. It will be assumed for purposes of this description of the mode of operation of the apparatus 10 that a suitable conventional form of boring means (not shown) cooperatively associated with the master machine head 68 has been employed to bore the stud hole 106 in the flange 17, and that now it is desired to effect the tapping of the stud hole 106. As such, the collapsible tap means 104 is mounted to the master machine head 68. Further, the collapsible tap means 104 in well-known conventional fashion accomplishes the tapping of the stud hole 106. For this purpose, rotation is imparted from the hydraulic motor 74 to the master machine head 68 and therefrom to the collapsible tap means 104. In addition, to the extent required the vertical, as viewed with reference to FIG. 1 of the drawing, positioning of the collapsible tap means 104 relative to the stud hole 106 is accomplished through the operation of the hydraulic motor (not shown) and adaptor (not shown) to which reference has previously been had hereinbefore. Once the stud hole 106 has been bored, drilled and/or tapped in the manner desired, the removal of the apparatus 10 from the flange 17 can be accomplished by unfastening the support means 14 from the tie down plate 18 through the removal of threaded fasteners 64 followed by the unfastening of the tie down plate 18 from the flange 17 through the removal of the threaded fasteners 46, and thereafter unthreading the tie down plugs 24 from the openings 38, 40, 42 and 44 that are provided in the flange 17.

Thus, in accordance with the present invention there has been provided a new and improved apparatus that is operative for performing selected machining operations. Moreover, the apparatus of the present invention is constructed such that the selected machining operations performed therewith consist of drilling, boring and tapping operations. In addition, in accord with the present invention an apparatus is provided for performing drilling, boring and tapping operations wherein such operations are conducted in a hostile environment. Further, the apparatus for performing drilling, boring and tapping operations in a hostile environment is constructed such that a characteristic of the apparatus is that it is portable. Additionally, in accordance with the present invention an apparatus for performing drilling, boring and tapping operations in a hostile environment is provided wherein a characteristic of the apparatus is that the boring means and the tapping means are combined in one apparatus. Also, the apparatus for performing drilling, boring and tapping operations in a hostile environment of the present invention is constructed such that a characteristic of the apparatus is that the openings formed thereby are capable of being precisely located relative to the surface in which they are made. Furthermore, in accord with the present invention an apparatus for performing drilling, boring and tapping operations in a hostile environment is provided wherein the apparatus is characterized in that it is relatively inexpensive to provide, it is easy to employ, yet is capable of providing reliable operation.

While only one embodiment of my invention has been shown, it will be appreciated that modifications thereof, some of which have been alluded to hereinabove, may still be readily made thereto by those skilled in the art. I, therefore, intend by the appended claims to cover the modifications alluded to herein as well as all other modifications which fall within the true spirit and scope of my invention.

What is claimed is:

1. A portable apparatus for performing machining operations at a precisely located site on a work surface having a plurality of openings formed therein with at least some of the plurality of opening being threaded comprising:

a. fixture means operative for securing the apparatus to the work surface such that the apparatus bears a predetermined relationship to the precisely located site on the work surface, said fixture means including a tie down plate, at least one tie down plug, at least one tie down disc and a first plurality of threaded fasteners, said tie down plate having a plurality of counterbored openings formed therein bearing the same orientation as the plurality of openings formed in the work surface, said tie down plate being positioned on the work surface in superimposed relation thereto such that said plurality of openings of said tie down plate are aligned with the plurality of openings of the work surface, said tie down plug being substantially circular in configuration and having threads formed around the circumferential external surface thereof, said tie down plug having a diameter corresponding to the diameter of at least the threaded ones of the plurality of openings formed in the work surface, said tie down plug further having a plurality of threaded openings bearing a predetermined relationship one to another formed at least partially therethrough and so as to extend axially thereof, said tie down plug being threaded into a threaded one of the plurality of openings formed in the work surface, said tie down disc being substantially circular in configuration and having a first portion and a second portion, said first portion of said tie down disc having a diameter corresponding to the diameter of the counterbored portion of said plurality of openings formed in said tie down plate, said second portion of said tie down disc having a diameter substantially the same as the diameter of said tie down plug, said tie down disc having a plurality of unthreaded openings bearing the same orientation one to another as do said plurality of threaded openings formed in said tie down plug and so as to extend axially thereof, said tie down disc being seated in one of said plurality of openings formed in said tie down plate such that said first portion of said tie down disc is positioned in the counterbore of one of said plurality of openings formed in said tie down plate and said second portion of said tie down disc is positioned in the uncounterbored portion of said one of said plurality of openings formed in said tie down plate, said first plurality of threaded fasteners extending through said plurality of unthreaded openings formed in said tie down disc and being threaded into said plurality of threaded openings formed in said tie down plug so as to fixedly secure said tie down disc and thereby also said tie down plate to said tie down plug and therethrough to the work surface such that the portable apparatus is properly positioned relative to the precisely located site on the work surface;

b. support means positioned on said fixture means so as to bear a predetermined relationship to the precisely located site on the work surface, said support means including an angle support bracket, a support member and a second plurality of threaded fasteners, said angle support bracket having a first base member, a second base member having a length greater than said first base member and an upstanding triangularly shaped member integrally joined to said first base member and said second base member, said first base member being positioned on said tie down plate in superimposed relation thereto and so that said second base member lies in a first plane that bears a predetermined relationship to the precisely located site on the work surface, said support member being secured on said second base member in superimposed relation thereto, said second plurality of threaded fasteners fastening said first base member to said tie down plate; and c. operating means movably mounted on said support means, said operating means including a first operating means supported on said support member for movement relative thereto in said first plane and second operating means operatively secured to said first operating means for movement therewith, said second operating means being operative to perform selected machining operations at the precisely located site on the work surface.

2. The portable apparatus as set forth in claim 1 wherein said support member comprises a feed table.

3. The portable apparatus as set forth in claim 2 wherein said first operating means comprises a machine head mounted on said feed table for movement in said first plane.

4. The portable apparatus as set forth in claim 3 wherein said second operating means comprises a collapsible tap means operatively secured to said machine head.

5. The portable apparatus as set forth in claim 4 wherein the selected machining operations comprises drilling, boring and tapping operations.

* * * * *